(12) United States Patent
Lee

(10) Patent No.: US 9,869,354 B2
(45) Date of Patent: Jan. 16, 2018

(54) CLUTCH CONTROL METHOD OF HYBRID VEHICLE

(71) Applicant: Hyundai Motor Company, Seoul (KR)

(72) Inventor: Ho Young Lee, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/332,686

(22) Filed: Oct. 24, 2016

(65) Prior Publication Data
US 2017/0335905 A1 Nov. 23, 2017

(30) Foreign Application Priority Data

May 20, 2016 (KR) ........................ 10-2016-0061908

(51) Int. Cl.
*B60K 6/46* (2007.10)
*F16D 48/06* (2006.01)
(Continued)

(52) U.S. Cl.
CPC .............. *F16D 48/06* (2013.01); *B60K 6/387* (2013.01); *B60K 6/46* (2013.01); *B60K 6/547* (2013.01); *B60Y 2300/18125* (2013.01); *B60Y 2300/42* (2013.01); *B60Y 2400/428* (2013.01); *F16D 2500/10412* (2013.01); *F16D 2500/308* (2013.01); *F16D 2500/30412* (2013.01); *F16D 2500/50287* (2013.01); *F16D 2500/70252* (2013.01); *F16D 2500/70264* (2013.01); *Y10S 903/914* (2013.01); *Y10S 903/919* (2013.01); *Y10S 903/946* (2013.01)

(58) Field of Classification Search
None
See application file for complete search history.

(56) References Cited

U.S. PATENT DOCUMENTS 6,126,251 A * 10/2000 Yoshii ...................... B60L 7/26
303/152
9,493,148 B2 * 11/2016 Nefcy .................. B60W 10/06
(Continued)

FOREIGN PATENT DOCUMENTS

JP       2010188805 A    9/2010
JP       2013-036474 A   2/2013
(Continued)

*Primary Examiner* — Dirk Wright
(74) *Attorney, Agent, or Firm* — Brinks Gilson & Lione

(57) ABSTRACT

The present disclosure provides a clutch control method of a hybrid vehicle of the including an entering condition determining step in which a controller determines whether shifting is being performed during regenerative braking; an error calculating step in which the controller calculates a torque error by subtracting observer torque, which is clutch transfer torque calculated by a clutch torque estimator receiving transmission input torque and motor speed, from map torque, which is clutch transfer torque calculated based on a clutch transfer torque map for clutch actuator strokes learned in advance, when shifting is being performed during regenerative braking; a correcting step in which the controller corrects the clutch transfer torque map for the clutch actuator strokes using the torque error calculated in the error calculating step; and a clutch control step in which the controller controls a clutch using the map corrected in the correcting step.

5 Claims, 5 Drawing Sheets

(51) Int. Cl.
*B60K 6/387* (2007.10)
*B60K 6/547* (2007.10)

(56) References Cited

U.S. PATENT DOCUMENTS

| | | | |
|---|---|---|---|
| 9,598,085 B2* | 3/2017 | Nefcy | B60W 30/18127 |
| 2010/0138121 A1 | 6/2010 | Porta et al. | |
| 2015/0151732 A1* | 6/2015 | Kim | B60W 10/02 |
| | | | 701/68 |

FOREIGN PATENT DOCUMENTS

| | | |
|---|---|---|
| JP | 5309962 B2 | 10/2013 |
| JP | 2014054862 A | 3/2014 |
| KR | 10-2014-0010319 A | 1/2014 |
| KR | 10-2014 0072520 A | 6/2014 |
| KR | 10-2015 0059926 A | 6/2015 |
| KR | 10-2015-0069400 A | 6/2015 |
| KR | 10-1543994 B1 | 8/2015 |

* cited by examiner

CLUTCH CONTROL METHOD OF HYBRID VEHICLE

CROSS REFERENCE TO RELATED APPLICATION

The present application claims priority to Korean Patent Application No. 10-2016-0061908, filed May 20, 2016, the entire contents of which are incorporated herein by reference.

FIELD

The present disclosure relates to a clutch control method of a hybrid vehicle.

BACKGROUND

The statements in this section merely provide background information related to the present disclosure and may not constitute prior art.

Generally, a powertrain that transmits power from an engine and a motor to a transmission through a dry clutch has a connection structure including an engine, engine clutch, motor, dry clutch, and transmission, in which the transmission may be an automated manual transmission (AMT) or a dual clutch transmission (DCT). FIG. 1 shows an example of a powertrain using a DCT.

For reference, the dry clutch between the motor and the transmission is considered to be a component of an AMT or a DCT in some cases, but is assumed here to be a separate component, as exemplified in FIG. 1.

The dry clutch (hereafter, briefly referred to as a 'clutch') has clutch transfer torque that is greatly changed in accordance with many factors such as the degree of friction due to single tolerance and durability of the components of a clutch, thermal deformation by high temperature, and changes in friction coefficient, so it is difficult to precisely determine the transfer torque that is the torque transmitted by a clutch while a vehicle is running.

However, if a change in transfer torque is not known while a clutch in a vehicle is controlled, the clutch may slip excessively or may cause a shock when engaging, so there is a need for estimating and correcting the transfer torque characteristics of a clutch in real time.

In particular, in a Hybrid Electric Vehicle (HEV) powertrain that transmits power from both an engine and a motor to a clutch, unlike the way a clutch typically transmits only engine torque to a transmission, it is desirable to estimate and correct transfer torque of a clutch in consideration of the influence on the clutch of the motor torque.

The description provided above as a related art of the present disclosure is just for helping understanding the background of the present disclosure and should not be construed as being included in the related art known by those skilled in the art.

Further areas of applicability will become apparent from the description provided herein. It should be understood that the description and specific examples are intended for purposes of illustration only and are not intended to limit the scope of the present disclosure.

SUMMARY

The present disclosure provides a clutch control method of a hybrid vehicle that can more accurately control clutch transfer torque during regenerative braking and shifting and can prevent or reduce deterioration of braking performance and shifting shock, by appropriately correcting clutch transfer torque characteristics learned under forward torque and by controlling a clutch during regenerative braking of a vehicle.

According to one aspect of the present disclosure, there is provided a clutch control method of a hybrid vehicle that includes: an entering condition determining step in which a controller determines whether shifting is being performed during regenerative braking; an error calculating step in which the controller calculates a torque error by subtracting observer torque, which is clutch transfer torque calculated by a clutch torque estimator receiving transmission input torque and motor speed, from map torque, which is clutch transfer torque calculated based on a clutch transfer torque map for clutch actuator strokes learned in advance, when shifting is being performed during regenerative braking; a correcting step in which the controller corrects the clutch transfer torque map for the clutch actuator strokes using the torque error calculated in the error calculating step; and a clutch control step in which the controller controls a clutch using the map torque corrected in the correcting step.

The error calculating step may calculate map torque according to a current clutch actuator stroke from the map and may use current motor torque for transmission input torque that is inputted to the clutch torque estimator to calculate the observer torque.

In the correcting step, an offset may be obtained by multiplying the torque error by a gain, and a curve of clutch transfer torque to a clutch actuator stroke of the map may be corrected by changing the inclination of the curve with respect to a touch point of the curve to form the offset calculated in the offset calculating step.

The method may further include a repetitive determining step that calculates again a torque error using map torque calculated from the corrected map and observer torque updated after the correcting step, repeats the correcting step when the recalculated torque error is a reference value or more, and performs the clutch control step when the recalculated torque error is less than the reference value, between the correcting step and the clutch control step.

The gain in the correcting step may be greater than 0 and may not be greater than 1.

According to the present disclosure, it is possible to more accurately control clutch transfer torque during regenerative braking and shifting and to prevent or reduce deterioration of braking performance and shifting shock, by appropriately correcting clutch transfer torque characteristics learned under forward torque and by controlling a clutch during regenerative braking of a vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
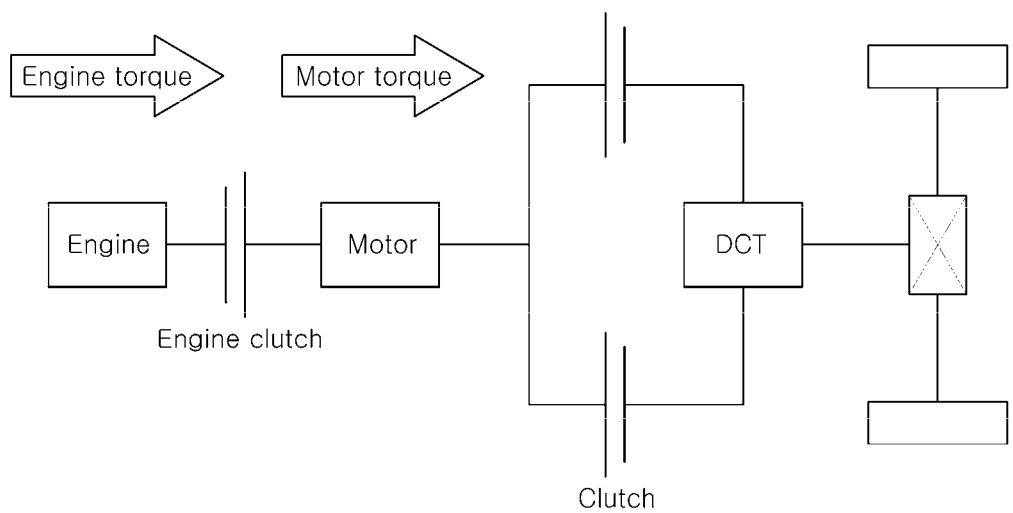
FIG. 1 is a diagram exemplifying a powertrain of a hybrid DCT vehicle of the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
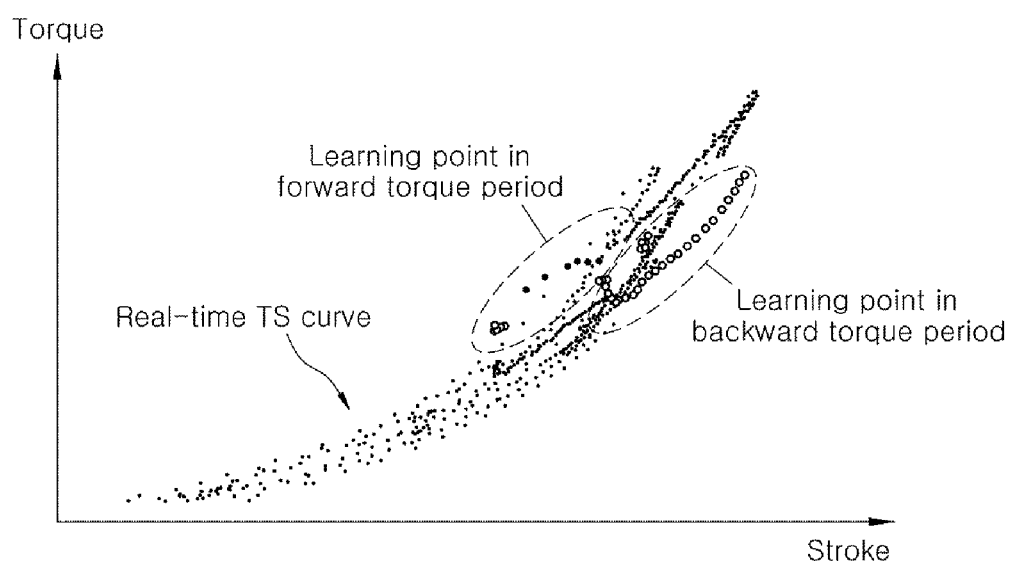
FIG. 2 is a view exemplifying real-time learning of characteristics of transfer torque based on a stroke of a clutch actuator.

In a regenerative braking period of an electric vehicle mode (EV mode), braking is performed by reversely driving only with a motor and a clutch is supposed to transmit backward torque between a transmission and the motor, and the backward transfer torque applied to the clutch results in behavior different from that of the forward transfer torque, as shown in FIG. 2.

FIG. 2 shows an example of learning, in real time, the characteristics of transfer torque depending on a stroke of a clutch actuator controlling a clutch. Referring to FIG. 2, it can be seen that the learning points of forward torque, that is the torque that is transmitted from an engine and a motor to a transmission through a clutch to drive a vehicle forward, are different from the learning points of backward torque that is transmitted from the driving wheels of the vehicle to the motor through the clutch. Therefore, the transfer torque characteristics of a clutch according to a stroke of a clutch actuator are different depending on the transfer direction of torque transmitted through the same clutch.

The reason for this is considered to be that inaccuracy of engine torque influences the clutch transfer characteristics under forward torque, but learning of clutch transfer torque is performed using only relatively accurate motor torque under backward torque.

When clutch transfer torque characteristics learned under forward torque are applied to a regenerative braking period under backward torque without considering the fact that the transfer torque characteristics of a clutch change depending on the direction of clutch transfer torque, as described above, braking performance is decreased and a shift shock is generated by inappropriate clutch transfer torque control.

Figure 3:
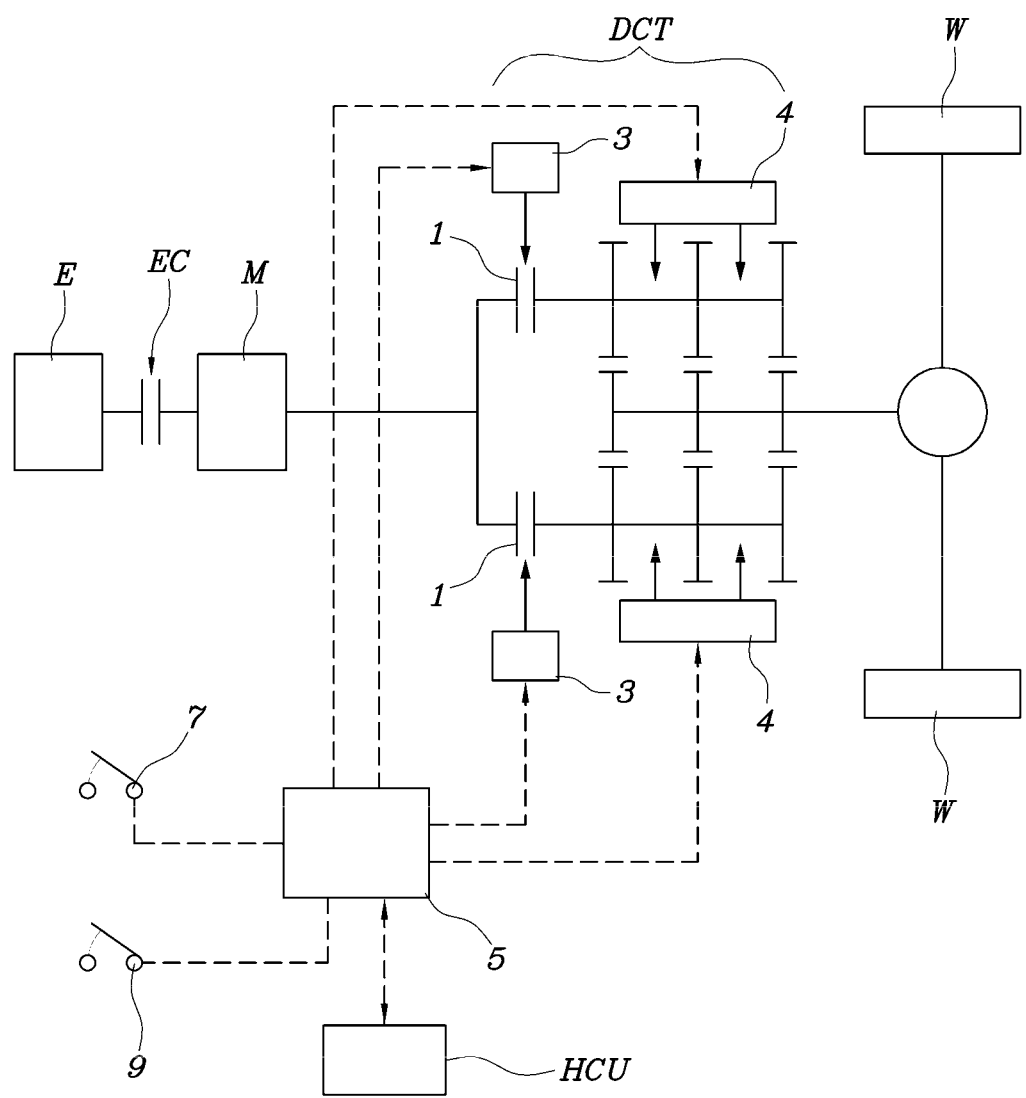
FIG. 3 is a diagram illustrating a powertrain of a hybrid vehicle to which a clutch control method of the present disclosure can be applied.

Referring to FIG. 3, an engine E and a driving motor M are connected to an engine clutch EC, power from an engine E and the motor M can be supplied to driving wheels W through a DCT (Dual Clutch Transmission), two clutches 1 of the DCT are controlled by clutch actuators 3, respectively, gears for gear stages are shifted by shift actuators 4 that selectively drive synchronizers, the clutch actuators 3 and the shift actuators 4 are controlled by a DCT controller 5, and the controller receives signals from an APS 7 (Acceleration Position Sensor) to recognize the amount that an accelerator pedal is pressed and receives signals from a BPS 9 (Brake Pedal Position Sensor) to receive information about operation of a brake pedal.

The DCT controller 5 receives information such as engine torque and engine speed and can communicate with a hybrid control unit HCU which is a higher-level controller, and the higher-level controller performs controlling such as distributing regenerative braking force and mechanical braking force by the driving motor M.

The DCT controller 5 and the higher controller may be separated form or may be integrated in a single unit. Similarly, they may be integrated with or separated from, and may communicate with an engine controller for controlling the engine.

Figure 4:
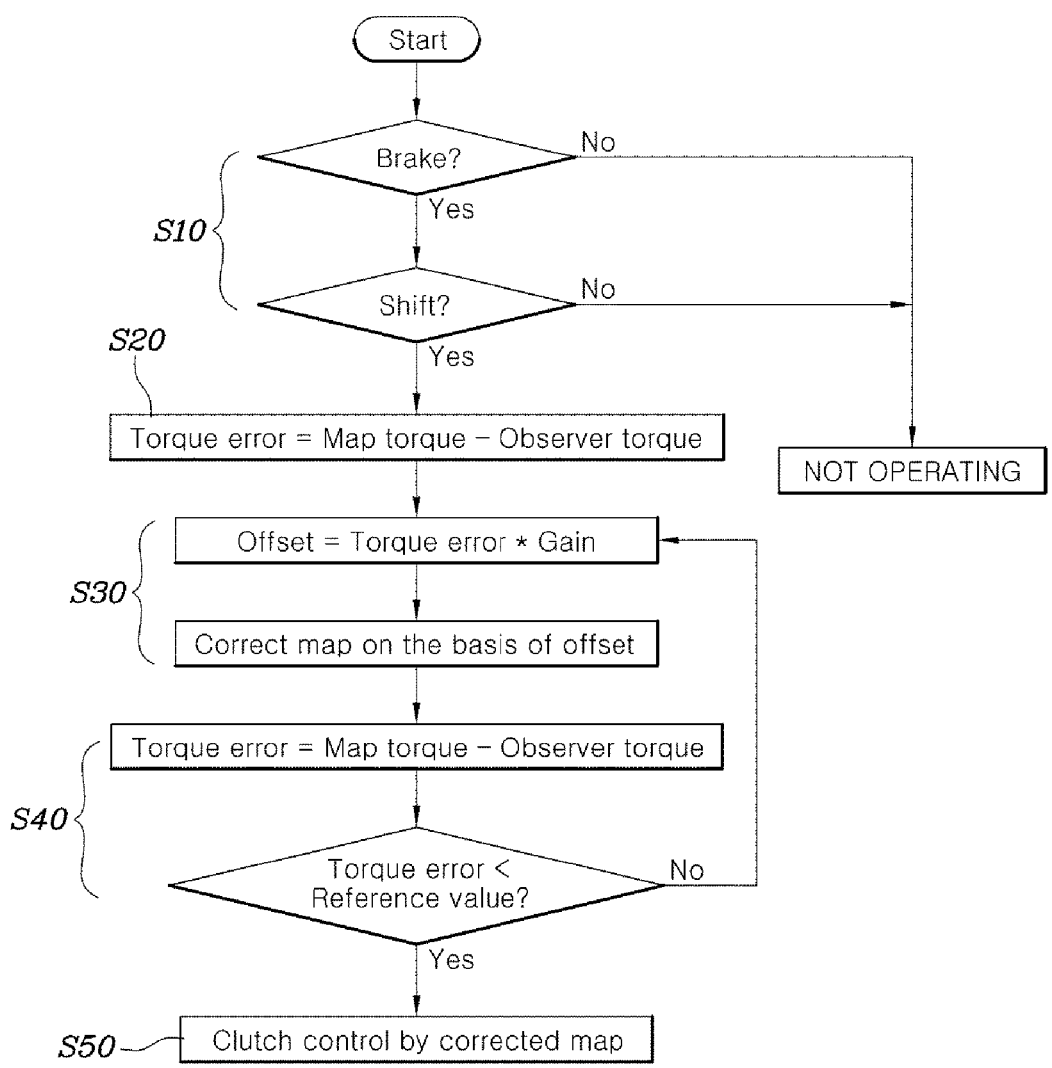
FIG. 4 is a diagram showing a form of a clutch control method of a hybrid vehicle according to the present disclosure.

Referring to FIG. 4, one form of the present disclosure includes: an entering condition determining step (S10) in which the controller 5 determines whether shifting is being performed during regenerative braking; an error calculating step (S20) in which the controller 5 calculates a torque error by subtracting observer torque, which is clutch transfer torque calculated by a clutch torque estimator receiving transmission input torque and motor speed, from map torque, which is clutch transfer torque calculated from a clutch transfer torque map for clutch actuator strokes learned in advance, when shifting is being performed during regenerative braking; a correcting step (S30) in which the controller corrects the clutch transfer torque map for the clutch actuator strokes using the torque error calculated in the error calculating step (S20); and a clutch control step (S50) in which the controller 5 controls a clutch using the map corrected in the correcting step (S30).

That is, the present disclosure determines whether shifting is being performed during regenerative braking in the entering condition determining step (S10), and when shifting is being performed during regenerative braking, the present disclosure calculates a torque error through the error calculating step (S20), corrects the map on the basis of the torque error, and controls a clutch on the basis of the corrected map, such that it is possible to improve linearity of braking that shows a linear change in braking force when shifting is being performed during regenerative braking, to prevent or reduce a shock that accompanies shifting, and to prevent or reduce deterioration of shifting response.

In the entering condition determining step (S10), the controller 5 can determine the braking situation based on a signal received from the a BPS 9 (Brake Pedal Position Sensor) regarding whether a driver is operating the brake pedal, so the controller 5 can receive information about the regenerative braking situation from an HCU and determines the entering condition by checking whether shifting is started in consideration of vehicle speed etc.

In the error calculating step (S20), the controller 5 calculates clutch transfer torque corresponding to the current clutch actuator stroke from the map, as the map torque, and uses the current motor torque for transmission input torque that is inputted to the clutch torque estimator to calculate the observer torque.

The clutch torque estimator may be similar to those known in the art, which calculate clutch torque on the basis of engine torque and engine speed, but, according to the present disclosure, clutch torque is calculated based on motor torque and motor speed.

The reason for using motor torque as the transmission input torque that is input to the clutch torque estimator is because there is a regenerative braking situation, so the engine clutch is disengaged, so the motor is the only component that can actually transmit torque to the transmission.

In the correcting step (S30), the offset is obtained by multiplying the torque error by a gain and a curve (T-S curve) of clutch transfer torque to a clutch actuator stroke of the map is corrected by changing the inclination of the curve with respect to a touch point of the curve to form the offset calculated in the offset calculating step.

Figure 5:
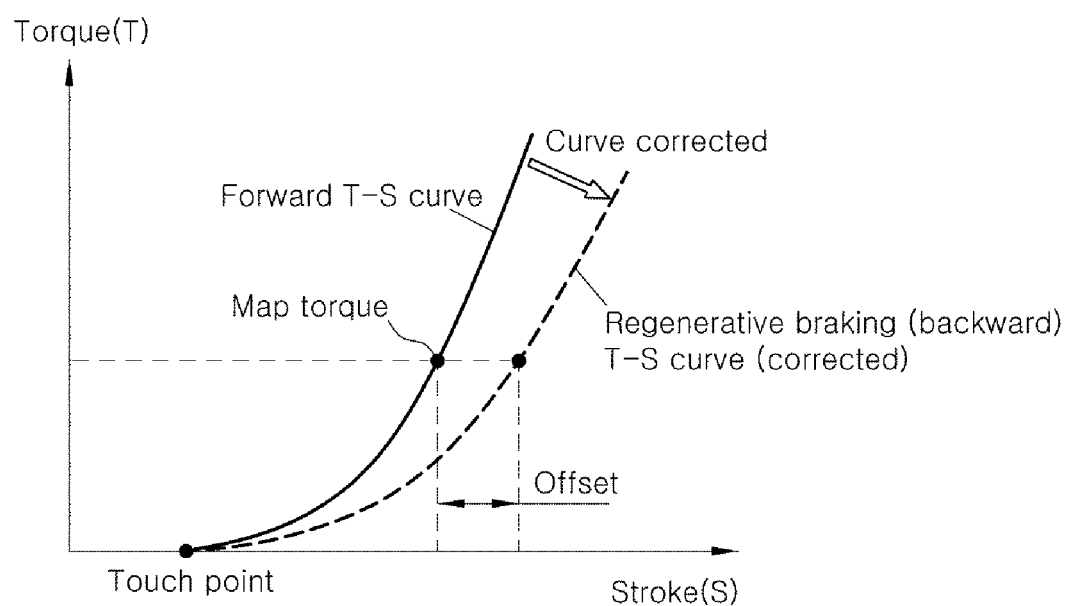
FIG. 5 is a diagram showing an example of correcting a curve of clutch transfer torque for a clutch actuator stroke according to the present disclosure.

For example, when the offset is obtained, as shown in FIG. 5, the T-S curve is corrected by turning the T-S curve by the offset with respect to the touch point.

The touch point is the point at which torque starts to be transmitted when the clutch transfer torque is approximately 0, that is, at which clutches physically start to come in contact with each other.

A repetitive determining step (S40), which calculates again a torque error using map torque calculated based on the corrected map and observer torque updated after the correcting step (S30), repeats the correcting step (S30) when the recalculated torque error is a reference value or more, and performs the clutch control step (S50) when the recalculated torque error is less than the reference value. The repetitive determining step (S40) is performed between the correcting step (S30) and the clutch control step (S50) in order to achieve more accurate and appropriate correction.

In some forms of the present disclosure, the gain in the correcting step (S30) may be set larger than 0 and not greater than 1 so that the map is not corrected to remove the torque error at once, but is corrected more gently and more accurately while reducing the torque error through repetition.

Accordingly, the reference value for comparing the torque error is appropriately set through repeated testing and analysis in consideration of the gain, the correction speed of the map, and the accuracy of correction.

As described above, when shifting is being performed during regenerative braking, according to the present disclosure, a clutch is controlled using a map corrected appropriately for the situation, so braking performance can be appropriately maintained and a clutch is appropriately controlled for shifting, whereby it is possible to prevent or reduce deterioration of braking performance.

Although the present disclosure was described with reference to specific forms shown in the drawings, it is apparent to those skilled in the art that the present disclosure may be changed and modified in various ways without departing from the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A clutch control method of a hybrid vehicle, the method comprising:
    an entering condition determining step in which a controller determines whether shifting is being performed during regenerative braking;
    an error calculating step in which the controller calculates a torque error by subtracting an observer torque, which is a clutch transfer torque calculated by a clutch torque estimator receiving a transmission input torque and a motor speed, from a map torque, which is a clutch transfer torque calculated based on a clutch transfer torque map for clutch actuator strokes learned in advance, when shifting is being performed during regenerative braking;
    a correcting step in which the controller corrects the clutch transfer torque map for the clutch actuator strokes using the torque error calculated in the error calculating step; and
    a clutch control step in which the controller controls a clutch using the clutch transfer torque map corrected in the correcting step.

2. The method of claim 1, wherein the error calculating step calculates the map torque according to a current clutch actuator stroke from the clutch transfer torque map and uses a current motor torque for the transmission input torque that is inputted to the clutch torque estimator to calculate the observer torque.

3. The method of claim 2, wherein in the correcting step, an offset is obtained by multiplying the torque error by a gain and a curve of the clutch transfer torque to a clutch actuator stroke of the clutch transfer torque map is corrected by changing an inclination of the curve with respect to a touch point of the curve to form the offset calculated in the offset calculating step.

4. The method of claim 3, further comprising a repetitive determining step that recalculates the torque error using the map torque calculated from the corrected map and the observer torque updated after the correcting step, repeats the correcting step when the recalculated torque error is greater than or equal to a reference value, and performs the clutch control step when the recalculated torque error is less than the reference value, between the correcting step and the clutch control step.

5. The method of claim 4, wherein the gain in the correcting step is greater than 0 and is less than or equal to 1.

* * * * *